(12) United States Patent
Venkitaraman (10) Patent No.: US 9,106,490 B2
(45) Date of Patent: Aug. 11, 2015

(54) METHOD, APPARATUS AND SYSTEM FOR SHARING MULTIMEDIA CONTENT WITHIN A PEER-TO-PEER NETWORK

(75) Inventor: Narayanan Venkitaraman, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 518 days.

(21) Appl. No.: 11/971,521

(22) Filed: Jan. 9, 2008

(65) Prior Publication Data

US 2009/0094317 A1    Apr. 9, 2009

Related U.S. Application Data (60) Provisional application No. 60/977,125, filed on Oct. 3, 2007.

(51) Int. Cl.

| | |
|---|---|
| G06F 15/16 | (2006.01) |
| H04L 12/28 | (2006.01) |
| H04J 3/16 | (2006.01) |
| H04L 29/12 | (2006.01) |
| H04L 29/08 | (2006.01) |
| H04L 12/701 | (2013.01) |
| H04L 12/707 | (2013.01) |
| H04W 40/34 | (2009.01) |

(52) U.S. Cl.
CPC .......... *H04L 29/12311* (2013.01); *H04L 45/00* (2013.01); *H04L 45/22* (2013.01); *H04L 61/2084* (2013.01); *H04L 67/16* (2013.01); *H04W 40/34* (2013.01)

(58) Field of Classification Search
CPC ...................................................... H04L 67/16
USPC .................. 709/230, 226, 237; 370/229, 389
See application file for complete search history.

(56) References Cited

U.S. PATENT DOCUMENTS

| | | | |
|---|---|---|---|
| 7,058,973 B1* | 6/2006 | Sultan | 726/12 |
| 7,778,194 B1* | 8/2010 | Yung | 370/252 |
| 2002/0052968 A1* | 5/2002 | Bonefas et al. | 709/231 |
| 2004/0190549 A1* | 9/2004 | Huitema | 370/466 |
| 2005/0004916 A1* | 1/2005 | Miller et al. | 707/10 |
| 2005/0018624 A1* | 1/2005 | Meier et al. | 370/318 |
| 2006/0193319 A1* | 8/2006 | Sung | 370/389 |
| 2006/0215654 A1* | 9/2006 | Sivakumar et al. | 370/389 |
| 2007/0110054 A1* | 5/2007 | Kozakai et al. | 370/389 |
| 2007/0121867 A1* | 5/2007 | Ozugur et al. | 379/201.1 |
| 2007/0127394 A1 | 6/2007 | Stirbu et al. | |
| 2007/0143488 A1 | 6/2007 | Pantalone | |

(Continued)

*Primary Examiner* — Aftab Nasir Khan
(74) *Attorney, Agent, or Firm* — Byrne Poh LLP (57) ABSTRACT

A system, method and communication device configuration for sharing multimedia content between network devices, such as UPnP or UPnP/DLNA devices and mobile communication devices, across different local networks or subnets. One possible system arrangement or architecture is based on the communication devices forming groups and then sharing UPnP control messages across the groups. The system arrangement supports enabling group member access to UPnP devices that are in other group devices or reachable via other group devices. By enabling devices to form groups across wide-area networks and distribute UPnP messages within the group members, the system effectively extends the range of a UPnP network. Devices include an overlay middleware and an xDLNA application to provide the functionality to form or join a device group and communicate multimedia content with other devices in the group as if the devices are within the same local network.

13 Claims, 4 Drawing Sheets

(56) References Cited

U.S. PATENT DOCUMENTS

| | | | |
|---|---|---|---|
| 2007/0189295 A1* | 8/2007 | Hamamoto et al. | 370/392 |
| 2007/0233845 A1* | 10/2007 | Song et al. | 709/223 |
| 2008/0024302 A1* | 1/2008 | Yoshida | 340/572.1 |
| 2008/0181222 A1* | 7/2008 | Takada et al. | 370/389 |
| 2008/0285565 A1* | 11/2008 | Gunther | 370/394 |
| 2009/0083572 A1* | 3/2009 | Fukui et al. | 714/2 |
| 2009/0116499 A1* | 5/2009 | Kokado | 370/401 |
| 2009/0313386 A1* | 12/2009 | Hamamoto et al. | 709/245 |
| 2010/0119069 A1* | 5/2010 | Kamikura et al. | 380/255 |

* cited by examiner

METHOD, APPARATUS AND SYSTEM FOR SHARING MULTIMEDIA CONTENT WITHIN A PEER-TO-PEER NETWORK

CROSS-REFERENCE TO RELATED APPLICATION

This application claims priority to the filing date of a U.S. provisional patent application having Ser. No. 60/977,125, entitled "Method, Apparatus And System For Network Mobility Of A Mobile Communication Device", filed on Oct. 3, 2007, which is incorporated herein by reference in its entirety.

BACKGROUND OF THE INVENTION

1. Field of the Invention

The invention relates to sharing information and multimedia content, and controlling its behavior among networked devices having local network applications. More particularly, the invention relates to sharing multimedia content between local network devices, including mobile communication devices, using wide area networks and broadband wireless networks.

2. Description of the Related Art

Recent years have seen a significant increase in the adoption of local network protocols, such as Universal Plug and Play (UPnP™) and Digital Living Network Alliance (DLNA) specifications for media sharing in many consumer devices, such as televisions, digital video recorders (DVRs), set top boxes and music players. Such specifications also can be used to share information with and control other devices, such as home gateways, lighting equipment controllers and home temperature controllers. Applications supporting UPnP and DLNA also are built into many PC-based applications, such as Windows Media Player. For example, a UPnP-based application may be used to transmit a photo from a mobile phone to a DLNA-compatible printer at home for printing, a television for display and a set top box for long-term archival. Similarly a mobile phone can also interact with a home lighting controller to adjust lighting conditions in a home. As UPnP/DLNA forums have specified an extensive set of features for sharing content and controlling media sessions, it would be advantageous if the same protocols and applications can be used for sharing content, controlling media sessions and managing device behavior not just between devices in a local network or a local broadcast domain, but more generically across any network. However, as UPnP applications rely on network based multicast for discovery, conventional UPnP devices are not able to discover each other and share content over a wide-area network. Also, conventional UPnP devices and applications use a relatively significant amount of bandwidth due to periodic advertisement messages and size of control messages. Furthermore, many local networks have private address spaces, and since many UPnP and DLNA messages carrying address information, these protocols currently can be used only in their local network.

The UPnP Forum is an industry-initiative designed to enable simple and robust connectivity among consumer electronics, intelligent appliances and mobile devices from different vendors. UPnP specifications typically define two kinds of logical devices: controlled devices and control points. Controlled devices respond to requests from control points. Multiple logical devices may reside in a physical endpoint simultaneously. Additionally, multiple services may exist on a given logical device. Once a device has an IP address, control points rely on periodic announcements or advertisements (to multicast address 239.255.255.250 and SSDP port 1900) from other logical devices and their services, using NOTIFY messages to enable discovery and maintain liveliness. Devices and services also respond to search queries called M-SEARCH from control points with an HTTP OK response. While M-SEARCH is multicast, the response message is unicast to the source IP address and port that was present in the M-SEARCH packet. Once a control point has discovered a device, it may use the URL in the message from the device to obtain the device description. The device description will be in XML format and provided by the device vendor. The control point can then invoke actions on the devices and poll for values.

The UPnP Audio/Video (AV) architecture defines the mechanisms for enabling a control point to coordinate the flow of multimedia content directly between a source device, termed the MediaServer, and a sink device, termed the MediaRenderer. The UPnP AV architecture also describes services, such as a content directory service and a connection manager server that will reside in a MediaServer. Similarly, UPnP also has standardized device and service descriptions for home lighting controllers, home gateway controllers and other controller devices.

One objective of DLNA is to provide seamless interoperability for consumer electronic computing and mobile devices using a communications and control backbone based on existing technologies and standards. DLNA uses the UPnP Device Control Protocol Framework, which provides relatively simple device networking in the home. DLNA Interoperability Guidelines use the UPnP AV architecture to provide the media management and control solution for devices. Two classes of DLNA-certified devices currently are defined: Digital Media Servers (DMS) and Digital Media Players (DMP) or Renderers (DMR). Player devices, e.g., television monitors and printers, can find and play or display multimedia content that is shared on a home or local network by server devices. Server devices, e.g., set-top boxes and DVRs, can record and store multimedia content, and share the multimedia content on the local network.

Consider, for example, a scenario including a group of friends, each with a mobile communication device. Assume that their mobile devices each have a number of UPnP-based applications. One objective is to enable these users to securely share content and control media flow between their devices, independent of type of network connectivity, using UPnP and DLNA. For example, if one user has a photo in their mobile phone, another user should be able be access the photo using DLNA, even if the users do not share the same subnet. Also, if one of the friends in a group of friends has a DLNA device and is located in a hotspot, other friends in the group of friends should be able to access the DLNA device in the hotspot. Furthermore, the system should be able to accommodate all use cases that are possible using UPnP specifications. Also, users should be able to access data from their local network DLNA devices using their mobile device when outside their local network. For example, a first user should be able to initiate a session between a home set top box and a second user's mobile device.

However, each user may potentially obtain service from a different access provider, and thus likely will be part of different access networks or subnets. A subnet typically is considered to be a physical network that forms a broadcast domain and shares a single IP address prefix, and often is served by one router. However, even if the users are part of or use the same access subnet, their ability to perform local multicast is relatively limited or non-existent. For example, a 3G access network will not allow a device to send periodic local multicast announcements because such would reduce network bandwidth and can induce battery drain by waking other devices from their respective idle modes. Also, devices in the home or local network may have only an IP address resulting from a Network Address Translation (NAT). Alternatively, the devices may be off-the-shelf devices, thus, it may not be possible to add new capabilities to the devices or to modify the behavior of the devices.

As discussed, UPnP uses periodic multicast announcements for device discovery. UPnP assumes the presence of a local broadcast network. When mobile devices with a wireless broadband interface, such as 3G or WiMax, have a UPnP stack, some applications, such as DLNA media players, cannot be used to share multimedia content directly between mobile devices. For example, if there are a group of friends in different networks (or even in the same network), they cannot use DLNA applications to share and/or control multimedia content between their phones.

Conventional methods exist that bridge UPnP devices. U.S. Patent Publication No. 20070127394 (A1) discloses a scheme for bridging a Bluetooth™ network with a UPnP device in an 802.11 network using an Inter-Working unit (IWU). The IWU prevents the transmission of UPnP multicast messages from the 802.11 domain into the Bluetooth domain. Thus, only if the Bluetooth devices in the Bluetooth domain query for a UPnP device or service will that request reach the 802.11 domain, and the response will reach the device that initiated the query. U.S. Patent Publication No. 20070143488 (A1) discloses a method for bridging a device in an Internet Protocol Multimedia Subsystem (IMS) network with a UPnP domain. The method involves the creation of a virtual control point that can look for local devices and communicate such information to the remote device, using session initiation protocol (SIP).

Conventional work involved with sharing multimedia content between mobile devices typically has focused on local area sharing using Bluetooth applications or using SIP over wide-area networks. Similarly, to access in-home content, conventional methods have proposed the use of SIP to access in-home devices. For instance, the SIP subscribe and notify mechanism is used to communicate the profile and status of devices in a home network to remote devices. Also, another conventional system uses a home gateway with an SIP-UPnP bridge therein to accesses in-home DLNA-certified devices from remote devices.

One conventional method proposes a scheme to extend UPnP for wide-area service discovery using an Intentional Naming System (INS). The method uses an UPnP-INS transcoder to convert UPnP M-Search queries to INS queries. The method creates a virtual device in the local network for remote devices. Another system tunnels all UPnP packets sent in a home network to a remote device. Such systems typically have significant bandwidth overhead and restrictions, such as accommodating only a single home network and not accommodating sharing between mobile devices.

Despite these existing methods and systems, there remains a need for securely sharing and controlling the flow of multimedia content between network devices, such as UPnP/DLNA devices, across different local networks or subnets, independent of the type of network connectively of the devices. Also, it is desirable for end users to be able to control and access data from their local network devices, such as DLNA devices, from outside of their local network, e.g., using their mobile communication device in a second local network or a public network. Similarly, end users should be able to access information in a remote device, such as a mobile communication device, or another device that may be connected to the remote device.

DETAILED DESCRIPTION

In the following description, like reference numerals indicate like components to enhance the understanding of the multimedia content sharing methods, devices and systems through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The methods, systems and devices described herein involve sharing information and multimedia content across subnets and controlling devices across subnets, e.g., between a local network device, such as a UPnP or UPnP/DLNA device, in a first subnet, and another network device in a second network or subnet. For purposes of discussion herein, the terms UPnP device and DLNA device are used interchangeably to refer to a device with an UPnP or DLNA based application. One possible system arrangement or architecture is based on the communication devices forming groups and then sharing UPnP control information and other DLNA protocol information across the groups. The system arrangement supports enabling group member access to UPnP devices that are in other group devices or devices reachable via other group devices. By enabling devices to form groups across wide-area networks and distribute UPnP information within the group members, the system effectively extends the range of a UPnP network. The system also reduces bandwidth use and enhances device battery life, as only selected messages, or selected information from the messages, are shared. Also, the devices can generate proxy advertisements and responses, on behalf of remote UPnP devices, that are reachable from other devices in the group.

In one embodiment, the system architecture is based on a peer-to-peer model. That is, the service logic is implemented by self-similar nodes cooperating with one another without relying on any service-specific intelligence in a network-based server. The system architecture is characterized by organizing devices into peer groups. In the inventive systems, methods and device configurations described herein, groups are determined or defined based on different logical notions. For example, one group of mobile communication devices may correspond to a particular set of friends, regardless of their respective device networks. There may be another group consisting of a few home gateways, PCs and mobile phones corresponding to the members of a particular family. In addition to such social groups, there may be groups based on end user context or interests. For example, a group may be defined by set of users who have purchased the same music album or have a matching interest profile. Since creating and maintaining groups is logically separate from the specific use of the group to share information and implement any service logic, the inventive system architecture, methods and device configurations described herein may be implemented to include a middleware that securely creates a group overlay without tying the group overlay to a particular protocol or service logic. The application to effectively extend DLNA, referred herein as xDLNA, may use the functions of this middleware to exchange information about UPnP devices and establish communication paths. Such functions are implemented in such a way that conventional or off-the-shelf DLNA applications can take advantage of its features without making any changes to their existing UPnP stacks or DLNA applications. Alternatively, both the middleware and xDLNA may be implemented in a single module. Unlike conventional approaches, the methods and systems described herein involve a purely UPnP-based solution that enables access to local network devices, such as UPnP and/or UPnP/DLNA devices, but also enables DLNA or UPnP-based sharing across groups of devices, such as mobile devices, home PCs, home gateways or devices that are reachable via devices in the group. Furthermore, the methods and systems described herein are optimized to accommodate the bandwidth constraints associated with using different networks.

Figure 1:
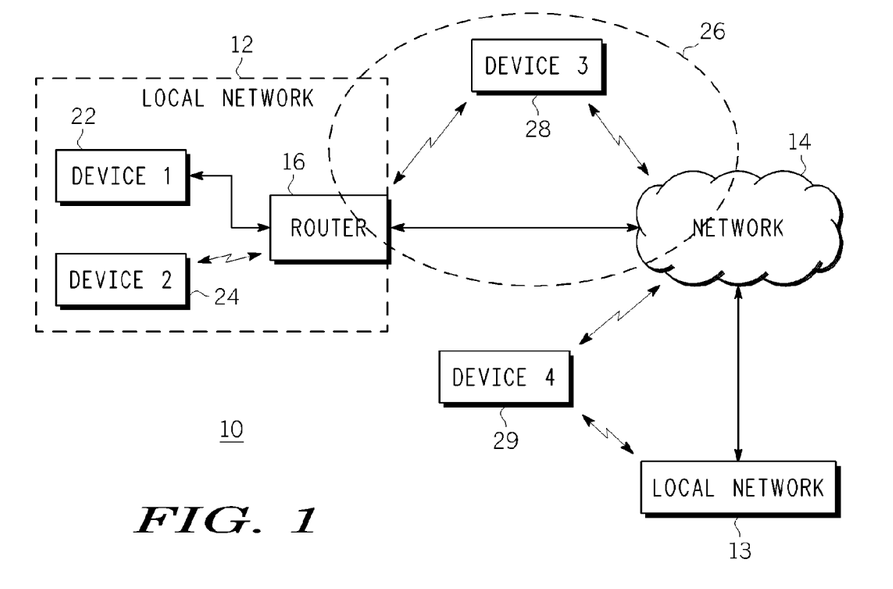
FIG. 1 is a block diagram of a peer-to-peer network arrangement for sharing multimedia content, including a first local or private network, a second network, and a mobile communication device for sharing multimedia content between the first and second networks.

Referring to FIG. 1, shown is a block diagram of a communication system 10 including one or more local or private networks 12, 13, such as a local area network (LAN), and a second network 14, such as a public network. The local networks 12, 13 can be coupled to the second network 14 via one or more suitable wired connections and/or wireless communications. The local networks 12, 13 may have private and overlapping address spaces.

The local network 12 includes a router 16 and one or more local network devices 22, 24 coupled to the router 16. The router 16 can be a residential gateway or other network element that allows the local network devices 22, 24 to communicate with each other in a local network arrangement and with the network 14, e.g., via the Internet 16 and/or other appropriate connection or communication.

The local network 12 can include one or more local network communication devices 22, 24, such as network devices configured to operate within a local network structure according to a set of guidelines established by the Digital Living Network Alliance (DLNA) and/or that support one or more universal plug and play (UPnP) protocols or other local network protocols. Such (DLNA or DLNA/UPnP) devices include multimedia content processing devices (such as televisions, set-top boxes and digital video recorders), computers, printers, servers, information storage devices, information playback devices and other suitable DLNA and/or DLNA/UPnP devices. The local network devices 22, 24 also can include other UPnP devices, such as home lighting controllers. The local network devices can communicate with the router 18 via any suitable wireline connection (e.g., as shown generally with the device 22) or wirelessly (e.g., as shown generally with the device 24).

The second network 14 can be or include any suitable communications network, such as one or more wired networks (e.g., a DSL or cable network), wireless telephone networks (e.g., 3G or WiMax) and/or one or more wireless local area networks (WLAN). The network 14 also can be or include the Internet and one or more intranets.

The communications system 10 also can include one or more end user communication devices, such as mobile communication devices 28, 29. Each of the mobile communication devices 28, 29 can be any suitable mobile communication device configured to communicate with one or more devices in the local network 12, via the router 18, and with the second network 14. The mobile communication device 28 can communicate with the local network 12 and the second network 14 wirelessly (as shown) or, alternatively, via one or more appropriate wired connections. For example, the mobile communication device 28 can be a mobile device having DLNA and/or DLNA/UPnP capabilities, i.e., a DLNA or DLNA/UPnP device. The mobile communication device 28 also can have Wi-Fi, Ethernet, WiMax, or other similar IP-based connectivity, although such is not necessary.

As will be discussed in greater detail hereinbelow, the mobile communication devices 28, 29 (and other end user devices) can form one or more groups across networks. For example, the mobile communication device 28 can form a group with one or more devices in the local network 12 and one or more devices in the network 14. The group is shown generally as a dashed group 26.

Figure 2:
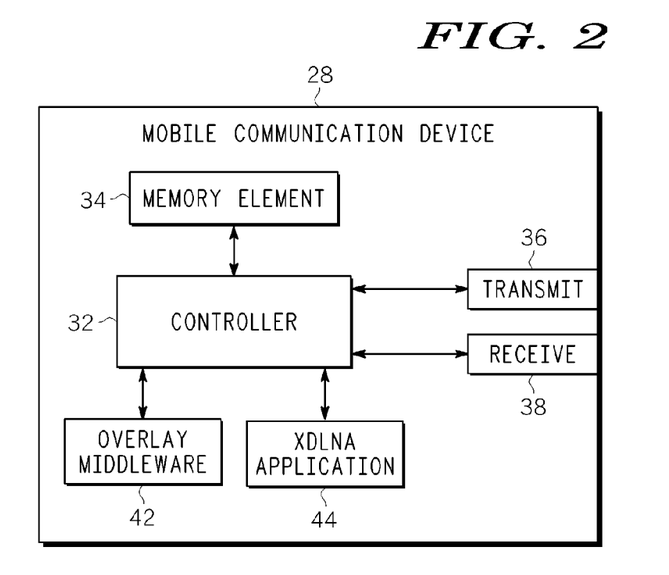
FIG. 2 is a block diagram of a mobile communication device configured for sharing multimedia content in a peer-to-peer network arrangement between a first local or private network and a second network.

Referring now to FIG. 2, with continuing reference to FIG. 1, shown is a block diagram of a communication device that can be part of a group, e.g., the communication device 28. Suitable communication devices include any mobile (or non-mobile) communication device configured for joining groups. For example, suitable non-mobile communication devices can include personal computers, digital video recorder (DVR) or digital video server (DVS) devices, including any signal converter or decoder (set-top) box with internal and/or external recording capabilities and local and/or remote storage, which often are referred to as personal video recorder (PVR) devices. Other suitable non-mobile communication devices include home or residential gateways, home media server systems, digital video disk recorders, televisions, or other suitable computing devices or video devices, including internet protocol (IP), satellite and cable digital video recorders, and home area network (HAN) devices and systems. Suitable mobile communication devices can include mobile and handheld computing devices, such as cellular telephones, smart telephones, personal digital assistants (PDAs), wireless handheld devices, digital cameras, music players, laptop personal computers (PCs) and notebook PCs. As discussed hereinabove, in addition to having local network connectivity compatibility (e.g., Wi-Fi), the mobile communication device 28 can be configured to also have IP-based connectivity capability, e.g., Ethernet, WiMax or other suitable IP-based connectivity, although such is not necessary.

The mobile communication device 28 includes a controller or processor 32 and a content storage element or memory device 34 coupled to the controller 32. In general, the controller 32 processes multimedia content and other information received and/or generated by the mobile communication device 28. In addition to the mobile communication device 28 having the content storage device 34, the controller 32 can include at least one type of memory or memory unit (not shown) and a storage unit or data storage unit coupled to the controller for storing processing instructions and/or information received and/or created by the mobile communication device 28.

The mobile communication device 28 also can include one or more input and/or output interfaces for receiving and/or transmitting multimedia content and other data and information. For example, the controller 32 and other components in the mobile communication device 28 can be coupled between a transmit interface 36 and a receive interface 38. It should be understood that one or more of the interfaces 36, 38 can be a single input/output interface (e.g., transceiver) coupled to the controller 32 and/or other components in the mobile communication device 28.

One or more of the controller 32, the memory element 34 and the interfaces 36, 38 can be comprised partially or completely of any suitable structure or arrangement, e.g., one or more integrated circuits. Also, it should be understood that the mobile communication device 28 includes other components, hardware and software (not shown) that are used for the operation of other features and functions of the mobile communication device 28 not specifically described herein.

The mobile communication device 28 can be partially or completely configured in the form of hardware circuitry and/or other hardware components within a larger device or group of components. Alternatively, the mobile communication device 28 can be partially or completely configured in the form of software, e.g., as processing instructions and/or one or more sets of logic or computer code. In such configuration, the logic or processing instructions typically are stored in a data storage device, e.g., the content storage device 34 or other suitable data storage device (not shown). The data storage device typically is coupled to a processor or controller, e.g., the controller 32. The controller accesses the necessary instructions from the data storage device and executes the instructions or transfers the instructions to the appropriate location within the mobile communication device 28.

With respect to the memory element 34, some end user communication devices typically include or have access to a hard drive or other storage element for recording multimedia content. However, the memory element 34 can be any suitable information storage unit, such as any suitable magnetic storage or optical storage device, including magnetic disk drives, magnetic disks, optical drives, optical disks, and memory devices, including random access memory (RAM) devices and flash memory. Also, although the memory element 34 is shown within the mobile communication device 28, the memory element 34 can be located external to the mobile communication device 28 and suitably coupled thereto.

The mobile communication device 28 also includes overlay middleware or an overlay middleware module 42 and an xDLNA application or application module 44, as will be discussed in greater detail hereinbelow. Although the overlay middleware 42 and the xDLNA application 44 are shown generally as being coupled to the controller 32 and the memory element 34, it should be understood that one or both of the overlay middleware 42 and the xDLNA application 44 can be partially or completely configured in the form of hardware circuitry and/or other hardware components within a larger device or group of components within the mobile communication device 28. Alternatively, one or both of the overlay middleware 42 and the xDLNA application 44 can be partially or completely configured in the form of software, e.g., as processing instructions and/or one or more sets of logic or computer code, within the mobile communication device 28. Furthermore, each of the xDLNA application 44 and the overlay middleware 42 can be implemented in the form of multiple components, or the xDLNA application 44 and the overlay middleware 42 may be implemented together as a single module.

As will be discussed in greater detail hereinbelow, it should be understood that a communication device that has an xDLNA application is not required to host any DLNA application or contain a UPnP stack. Also, in a given subnet, such as the local network 12, there may be more than one device with the xDLNA application and/or the overlay middleware. One or both of the local network 12 and the second network 14 can include other UPnP and DLNA network devices, including residential gateways and network routing devices, including devices that do not have the xDLNA application or the overlay middleware. Other such suitable UPnP and DLNA network devices include one or more of a signal converter box, a signal decoder box, a digital video recorder, a digital video disk recorder, a personal video recorder device, a home media server, a digital video server, a printer, a television, a video camera, a residential gateway, a video receiver, and a computer.

In one embodiment, the overlay middleware 42 provides the control path functions of secure group creation and maintenance, and data path functions of enabling group communication. The overlay middleware 42 provides an application programming interface (API) to enable the xDLNA application to join a group, to find peer xDLNA applications in other devices, and to coordinate with those found peer xDLNA applications to extend UPnP/DLNA from a single subnet to an extended group of devices. Each group is uniquely identified by a <group_name, identity_domain> tuple. Similarly, the overlay middleware 42 identifies each device in a group, irrespective of the device's underlying IP address, using a device identifier (device_ID). In one instantiation, device_ID can be a random number; in another, the device_ID may be 128-bit truncation of a public key generated during the installation of the overlay middleware 42. A device can be a member of multiple groups, but must have the necessary group specific credentials, such as a password or a certificate, to claim membership.

For a new device to join a group, the overlay middleware 42 in the new device first finds at least one current group member, and then learns information about other peer devices in that group from that group member. A group member that enables new devices to bootstrap into the group is known as a super peer (SP). Each identity domain may use domain specific schemes for secure directory lookup and update. A domain name server (DNS) can be used for a directory service. Alternatively, other forms of directories, such as Dynamic DNS (DDNS), SIP registrar, and Distributed Hash Table (DHT) can be used, and may all coexist. If the identity domain field is itself a routable value (such as an IP address or phone number), such value may be used directly to contact the super peer (e.g., by sending an IP packet or SMS message) without requiring a directory lookup.

Since all nodes essentially are equivalent, any group member that has the credentials to register in the directory can play the role of a super peer. When there are more capable nodes in a group, such as a node without battery constraints, those particular nodes can take over the role of a super peer from one or more, less capable super peers. For fault tolerance, group members track each other, and any group member can take over as a super peer when an existing super peer leaves or becomes unavailable. Once there is at least one super peer in a group, a simple directory lookup, using the group name as the key, can serve the purpose of enabling a new device to find the super peer's contact, such as IP address/port or an identifier, such as a phone number or an NAT server login name, to contact the super peer. The new device can then query the super peer for information about other peers in the group.

A new device joins a particular group by informing other devices in the group of the new device's presence. The exchange of presence information is used to authenticate the new device's (node's) membership within the group, as well as to diffuse information about the available of at least the xDLNA application in the local device to other devices in the group. In one instance, an identifier, termed application_ID, can be used to identify an application. The overlay middleware 42 builds a list of application_IDs based on applications that have joined a group. In another instance, the overlay middleware 42 can build the application list based on installed applications in a device. The overlay middleware 42 in devices that are behind a Network Address Translation (NAT) firewall can use conventional schemes, e.g., using STUN/TURN servers or configuring the gateway for port forwarding, to enable new devices to communicate therewith. As is known, STUN (Simple Traversal of UDP through NAT firewalls) is a protocol for assisting devices behind an NAT firewall or router to determine their public IP address/port and thereby assist with their packet routing, and TURN (Traversal Using Relay NAT) is a protocol that allows for an element behind an NAT firewall to receive incoming data over TCP or UDP connections.

For example, when a device behind an NAT firewall joins a group, the device determines and provides its reachable identifier information (such as a public IP address/port or an account name in an NAT traversal server) to the existing group members, so that subsequent group members can obtain the reachable identifier required to reach the device currently joining the group. For NAT firewalls that support UPnP gateway device specifications, the overlay middleware 42 also can configure the NAT firewall to forward packets destined to the overlay middleware port to the appropriate NAT-ed IP address of the device hosting the middleware. These measures relieve xDLNA and other applications that use the middleware from having to address issues related to communicating with peer applications that reside in devices behind an NAT firewall. Therefore, in general, in one embodiment, the overlay middleware 42 handles the generic functions of secure group formation and maintenance, service discovery and group communication. In other embodiments, these functions may be provided by multiple different modules, or may be built into the xDLNA application along with the features discussed hereinbelow.

The xDLNA application 44 implements the necessary service logic to effectively extend DLNA functionality across multiple subnets. In one embodiment, the xDLNA application 44 uses the API of the overlay middleware 42 to join one or more groups. For example the xDLNA application 44 may join a group called <friends.alice, somedirectory.domain>. The xDLNA application 44 can then find its peer xDLNA applications in other devices in the group using callbacks that are provided by the overlay middleware 42. The xDLNA application 44 also can send/receive messages with one or more members in the group using the APIs provided by the overlay middleware 42. In another embodiment, an xDLNA application can create a connection (such as a TCP connection) with the second xDLNA application, for subsequent message exchanges, without using the middleware. For example, a first xDLNA application in a mobile communication device (e.g., the mobile communication device 28) can send its public IP address and port to other xDLNA applications in its group, such as to the router 16 using an NAT traversal server account and to another mobile communication device 29 using an SMS message. Then, each of the xDLNA applications in the router 16 and the mobile communication device 29 can create a TCP session with the first xDLNA application in the mobile communication device 28. Alternately, the second xDLNA application may be registered in an SIP server, and the first xDLNA application can use SIP to establish a session with the second xDLNA application.

To extend UPnP functionality, the xDLNA application 44 discovers local UPnP devices and services (based on their multicast advertisements and responses to search requests). When an xDLNA application finds another xDLNA application in its group, the xDLNA application selectively sends information about UPnP devices in its local network to its peer xDLNA application. On receiving this information, the peer xDLNA application re-advertises this information in their local domain. In the relatively simple case, where the address, included in the information provided by the first xDLNA application corresponding to UPnP devices in its network, is routable from the second xDLNA application network, the address information needs no modifications. In some instances, the xDLNA may enable routability by appropriately configuring the routing table. For example, in FIG. 1, the xDLNA application in Device 3 (28) can make an address in the local network 12, corresponding to Device 1 (22), reachable from Device 3 (28) by creating a UDP tunneled route for IP address corresponding to Device 1 (22) to a public address/port of a device in the local network 12. Once the remote UPnP applications have discovered each other, the UPnP applications can communicate directly between each other without the intervention of the xDLNA application 44.

Next, consider a scenario involving the system 10 shown in FIG. 1. Assume that the local network 12 is Alice's home network, and Alice's home network includes a personal computer (PC) that hosts a DLNA media server and a residential gateway (e.g., as part of the router 16). In this scenario, Alice, with the mobile communication device 29, visits the second network 13, which is a hotspot or the home network of one of Alice's friends. As part of this example, assume that the second network 13 includes a DLNA television (not shown) and a WLAN router (not shown). In addition to the local network 12 and the second network 13, there is the mobile communication device 28, which, in this example, belongs to Alice's spouse.

In the above scenario, many of the devices (e.g., the network devices and the mobile communication device 29) may have a NAT-ed IP address. Such addresses are not routable outside of their local networks. Also, because of the manner in which the address of many network devices are assigned, e.g., by the various device manufacturers, Alice's PC in the home network 12 may have the same address as the DLNA television in the second network 14. Furthermore, not all devices will have the overlay middleware 42 or the xDLNA application 44.

In this scenario, the objective is to enable all the use cases that are possible using DLNA, as if all the devices were in the same broadcast domain. For example, the mobile communication device 29 should be able to view multimedia content located in Alice's PC in the home network 12, e.g., using the DLNA television in the second network 13, even though neither Alice's PC in the home network 12 nor the DLNA television or WLAN router in the second network 13 is equipped with the overlay middleware 42 or the xDLNA application 44.

To address the objective in this case, in the domains that are being extended, there should be at least one node with the overlay middleware and the xDLNA application. As indicated earlier, it is not necessary for that node to also have a DLNA application or UPnP stack. That particular node will receive information about remote UPnP devices and services, advertise them locally with the necessary identity translations, and handle communication destined to the translated identity. The node also will inform other remote members about UPnP devices and services in its local domain. For example, assume that only the residential gateway in the home network 12 and the mobile communication devices 28, 29 have the overlay middleware and the xDLNA application. Although the process of finding peer xDLNA applications in other devices behind an NAT firewall and communicating with the discovered xDLNA applications is handled by the overlay middleware 42, for the xDLNA application 44, the key issue in this case is that the advertisements (and many subsequent messages) generated by the UPnP devices within an NAT-ed network will have an NAT-ed address embedded inside them. If a remote DLNA device receives this information and tries to contact the NAT-ed address, those packets will not reach the intended recipient.

To address this issue, on receiving information about a remote UPnP device in a message from a remote peer, the xDLNA application 44 maps the IP address and port number in the message to its local IP address and a local port number. Also, when the xDLNA application 44 receives messages destined to this local port, the xDLNA application 44 may respond directly if the xDLNA application 44 has access to sufficient information. Alternately, the xDLNA application 44 can reverses the local IP address and port information in the message content to the original IP address and port number, and send the information to a remote xDLNA application. In the latter case, the xDLNA application 44 also determines the peer device corresponding to this connection and forwards the packet to the peer device using the API provided by the overlay middleware 42. It should be noted that, in addition to the information obtained from UPnP discovery messages (such as NOTIFY), the NAT-ed IP address will be embedded in other messages. For example, the content directory service embeds the IP address of the media server as part of the rtsp URLs sent in response to a request from control points. Therefore, in this approach, all message exchanges between non-local UPnP devices will traverse the xDLNA application.

Figure 3:
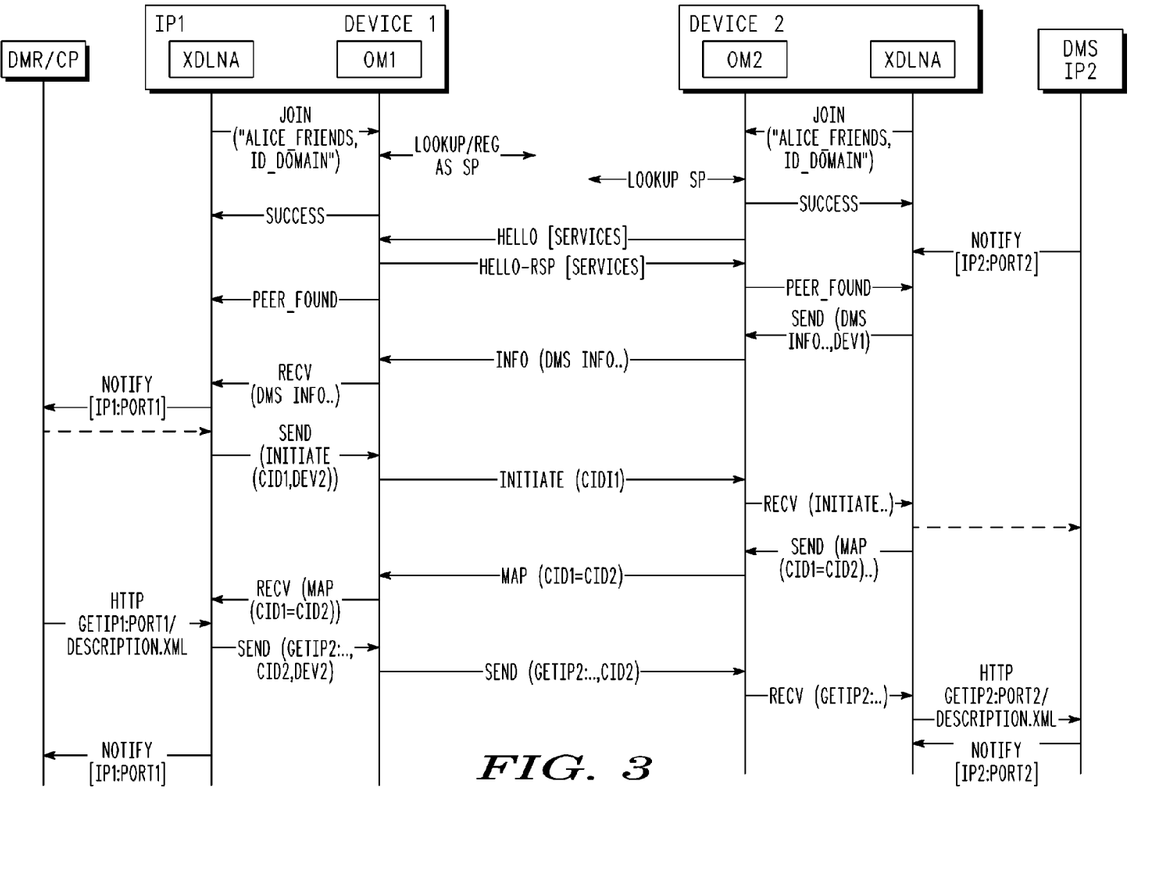
FIG. 3 is a data flow diagram of two communication devices sharing multimedia content within a peer-to-peer network arrangement, from a first network to a second network.

Referring now to FIG. 3, with continuing reference to FIG. 1 and FIG. 2, shown is a data flow diagram of two communication devices (Device 1 and Device 2) in different subnets discovering each other and subsequently sharing multimedia content across the subnets. The two devices each include an overlay middleware and an xDLNA application. FIG. 3 also shows one DLNA media application, which can be co-resident in Device 1 or Device 2, or can be present in the respective local subnets of the devices.

Initially, the xDLNA application in Device 1 joins the group. Upon receiving a request to join a group, e.g., <alice_friends, id_domain>, its overlay middleware first determines the super peer. In one instance, the overlay middleware does a lookup of alice_friends.id_domain in a directory service of id_domain to determine if there is any member already registered in the directory for the group. If no member is present, the overlay middleware registers the IP address of the requesting device using the protocol corresponding to the directory service. Accordingly, the requesting device becomes a super peer for the group.

Using a similar lookup, the overlay middleware in Device 2 finds the super peer (Device 1) and initiates a connection to the overlay middleware in Device 1. It should be noted that if the id domain portion is itself an IP address or another reachable identity, such as a phone number, then no directory service or lookup is needed; the overlay middleware can use that IP address as the super peer. For example, if the domain portion is sip: 1234567890, then the overlay middleware can directly call the phone number 1234567890 super peer, using Session Initiation Protocol (SIP) to establish a connection. The super peer may validate the new member using the security credential corresponding to the group and provide the device id and the reachable ids (such as IP address/ports, NAT traversal server account names, and/or phone number) of other members of the group. Based on the reachable ids, the middleware may establish and maintain the appropriate communications path to the peer devices. This communications path may be modified by the middleware when the context changes (e.g., when a shorter or longer bandwidth path becomes available). In one implementation, a TCP connection can be established between peer middleware applications, and the communications between peer xDLNA applications flow via this TCP connection. Using a hello exchange via this connection, the respective middlewares learn that both devices have an xDLNA application and provide a callback (Peer_Found) to their respective local xDLNA applications. As part of the call back, the middleware may provide various information, such as device identification and alias names of the peer device, and whether the peer device is behind an NAT firewall.

The xDLNA application typically uses standard UPnP schemes to determine information about devices in its local network. For example, as shown in FIG. 3, as defined in the UPnP standard, a periodic advertisement message (NOTIFY) is generated by the Media Server (DMS) in the local network of Device 2. The xDLNA application uses a Berkeley socket interface (or other suitable interface) to receive these messages, and thus find information about devices in its local network. Upon finding a new peer, such as receiving a Peer_Found call back from the overlay middleware, the xDLNA application selectively sends information it has about local UPnP devices and services to the new peer device. Similarly, upon finding new UPnP devices in a local network, the xDLNA application may use the API provided by the overlay middleware to send this message to all or selected the peer xDLNA applications. The peer xDLNA applications that receive information about particular local UPnP devices may be selected, e.g., based on the configuration information provided by the user, thus matching the capability of the source device with remote devices. The message is sent via the connection that the overlay middleware maintains with its other peer devices.

At Device 1, the overlay middleware in Device 1 receives this message and sends the message to its xDLNA application. The xDLNA application modifies the original IP address and port number (ip2:port2) in the received information to a local IP address and port number (ip1:port1) to create a new message compatible with the local network protocol. The xDLNA application also may modify other information, such as the name of the remote device, the keep-alive time, and other information (e.g., based on local policy), to create the new message. The xDLNA application then transmits this new message within its local network domain. The xDLNA application also may combine information about multiple devices in a remote network to create a single virtual device, and create a new message corresponding to the virtual device. Based on its policy, the message may be transmitted only to a loop back address (if only Device 1 should be able to see remote devices) or to a SSDP multicast address (to enable anyone in Device 1's broadcast domain to see remote devices) or to a unicast address of selected devices reachable from Device 1. If the new port number is used in the received messages, then the xDLNA application also creates a new local IP address:port pair and a listener socket for TCP connections to that new port. For devices in the group corresponding to that device's ip:port tuple, there is a unique local ip:port tuple. In FIG. 3, upon receiving the NOTIFY message from DMS, Device 2 stores the information. When the connection with Device 1 has been established, Device 2 sends information about selected devices in its local network to the new xDLNA application. Though not shown, Device 2 also may receive similar information from the xDLNA application in Device 1. Upon receiving this information, as new port (port2) is present, a new mapping (to port1) is created and a corresponding TCP listener socket is created. When more NOTIFYs are received from Device 2 with ip2:port2, the xDLNA application in Device 1 uses the same ip1:port1 mapping, instead of ip2:port2. Upon receiving a packet to ip:port, the xDLNA application (e.g., ip1 and port1 at Device 1) can determine the intended peer device and the IP address/port reachable from that device (e.g., Device 2 and ip2:port2).

The control point (CP) receives this advertisement and learns about the DMS in Device 2. The control point can then receive more information about the DMS using the HTTP GET and other such messages defined in the UPnP or DLNA standards. When the control point or DMR in Device 1, or in the subnet within which Device 1 is located, initiates a TCP connection to IP1:port1, the xDLNA application in Device 1 will receive this connection. The xDLNA application then sends an INITIATE message, with the local connection identifier (CID1), to its peer in Device 2 corresponding to ip1:port1. This INITIATE message triggers Device 2 to, in turn, initiate a TCP connection to the "real" device at ip2:port2. Device 2 initiates this connection and may send a connection identifier (CID2) to Device 1. This exchange of connection identifiers is one way to enable the xDLNA applications to discover the state identifiers of each other. The xDLNA applications can use the discovered state identifiers to refer to connections when packets need to be sent via a specific connection, when more connection information is needed or when connections are torn down. Thus, in this embodiment, the logical connection from the control point to the DMS consists of 5 physical connections, first from the control point to the xDLNA application in Device 1, second between the xDLNA application in Device 1 and the overlay middleware in Device 1, third between the overlay middleware in Device 1 and the overlay middleware in Device 2, fourth between the in Device 2 and the xDLNA application in Device 2, and fifth to the DMR.

One of the advantages of this embodiment is that the DLNA devices, such as the DMR/CP and the DMS in FIG. 3, need not be aware of the changes in the IP address or the temporary disconnections of the remote devices. For example, if a DMR that is reachable via Device 1 is receiving data from a DMS that is reachable via Device 2, and Device 1 moves from a one network (e.g., a hotspot) into another network (e.g., a wide-area network, such as WiMax), the temporary disconnection and address change will be handled by the xDLNA applications. The xDLNA application in Device 2 will realize that it cannot send any data to the xDLNA application in Device 1 and will pause reception from the DMS. In the case of using socket interfaces, such process can be implemented by not calling the read system call on the socket descriptor that is sourcing the packets to be sent to the xDLNA application in Device 1. This will result in a TCP flow control window becoming shut, thus pausing the transmission of data from the DMS. When the connection with the xDLNA application in Device 1 has been re-established, the home xDLNA application resumes packet reception from its connection to DMS. The renderer application in the mobile device that changed the IP address also is not affected because its connection is only to the local xDLNA application. The same approach also handles temporary disconnections.

An issue with splitting connections between a media server and a media renderer is that, if their congestion levels are different, significant overhead will be needed to buffer the data in the intermediate points. To avoid such situations, when no more data can be sent via a connection, the xDLNA application stops receiving data from the corresponding source connection(s) that is feeding data into the connection that cannot receive data. In one embodiment, the xDLNA application can determine this situation when the xDLNA application sends "n" bytes of data using a send( ) system call, but receives a return value that is less than "n." This approach closes the flow control window in the source and prevents the intermediate device from having to buffer large amounts of data. The same approach also is used to temporarily pause the transmission of packets from one xDLNA application to another xDLNA application. In embodiments where the overlay middleware and the xDLNA application are separate modules, the overlay middleware also can use a similar approach to pause the transmission of data from the xDLNA application and from a peer overlay middleware. This, in turn, will result in the xDLNA application pausing the reception of data from the source. In another embodiment, the middleware or the xDLNA application can send a "PAUSE" message to the peer application to trigger the peer application to close the flow control window.

The control point sends a message such as the following to obtain the description.xml file:
GET /desc/MediaServer_desc.xml HTTP/1.1
Accept: text/xml, application/xml
User-Agent: Mozilla/4.0 (compatible;
UPnP/1.0; Windows NT/5.1)
Host: ip1:port1
Connection: Keep-Alive
Cache-Control: no-cache
Pragma: no-cache The xDLNA application in Device 1 receives this message via a TCP connection. If the xDLNA application in Device 1 has already received the information necessary to respond to this message from the xDLNA application in Device 2, then the xDLNA application in Device 1 generates the response. Otherwise, the xDLNA application in Device 1 reverses the address in the Host: field to ip2:port2, and calls its corresponding overlay middleware to send this message to its xDLNA application peers (e.g., Device 2 in FIG. 3). The overlay middleware in Device 1 uses its TCP connection with the overlay middleware in Device 2 to deliver this message to the xDLNA application in Device 2. The xDLNA application in Device 2 may cache this information and use it to respond to subsequent requests for the same information. In another embodiment, xDLNA application in Device 2 can obtain the description file and additional information, such as the list of files and folders when it discovers the DMS, and can provide all or parts of that information to the xDLNA application in Device 1 as part of the Info(DMS Info) message. Such information may be sent in a compressed form to save bandwidth. Such information also may be encrypted to protect the information, e.g., a group key and/or a share key between the xDLNA applications. Alternately, the overlay middleware can provide the functions of compression and encryption. Such information can then be used to rapidly respond to a request.

One of the issues in using UPnP with mobile devices is that UPnP relies on periodic advertisements to keep track of devices in the network. This can be a significant drain on battery power and a significant load on the wireless network. In the methods, systems and devices described hereinabove, these issues are addressed by enabling the xDLNA application in a device to proxy for remote devices. Therefore, even when a mobile device goes idle, the xDLNA application in other devices in its group can be configured to generate advertisements on behalf of the UPnP services in the mobile device. When a mobile device is shutdown, the group middleware sends a BYE message to the group, triggering the xDLNA application in the gateway to stop advertising for UPnP services in that mobile device.

Continuing with the message flow in FIG. 3, the xDLNA application in Device 2 does not forward further NOTIFY messages for the same UPnP device (identified using UUID: field) to Device 1. Instead, Device 1 (and other xDLNA applications in the group that have received the NOTIFY message) sends the periodic NOTIFY message locally. Therefore, a NOTIFY message is sent only to remote xDLNA applications that have not yet been sent the NOTIFY message. When a local UPnP device sends a BYE message (a NOTIFY message with state: set to ByeBye) or has not sent NOTIFY messages for an extended period, the xDLNA application may inform its peers to stop sending proxy advertisements corresponding to that device in their local domain. When a device hosting the xDLNA application gets disconnected, other xDLNA applications find that information (e.g., by receiving callbacks from their respective overlay middlewares), and remove states corresponding to the disconnected xDLNA application and its UPnP devices. Also, the xDLNA application can readily respond to an M-SEARCH request in the local domain, using a locally generated or stored HTTP response, without the addition of the wide area network latency.

Figure 4:
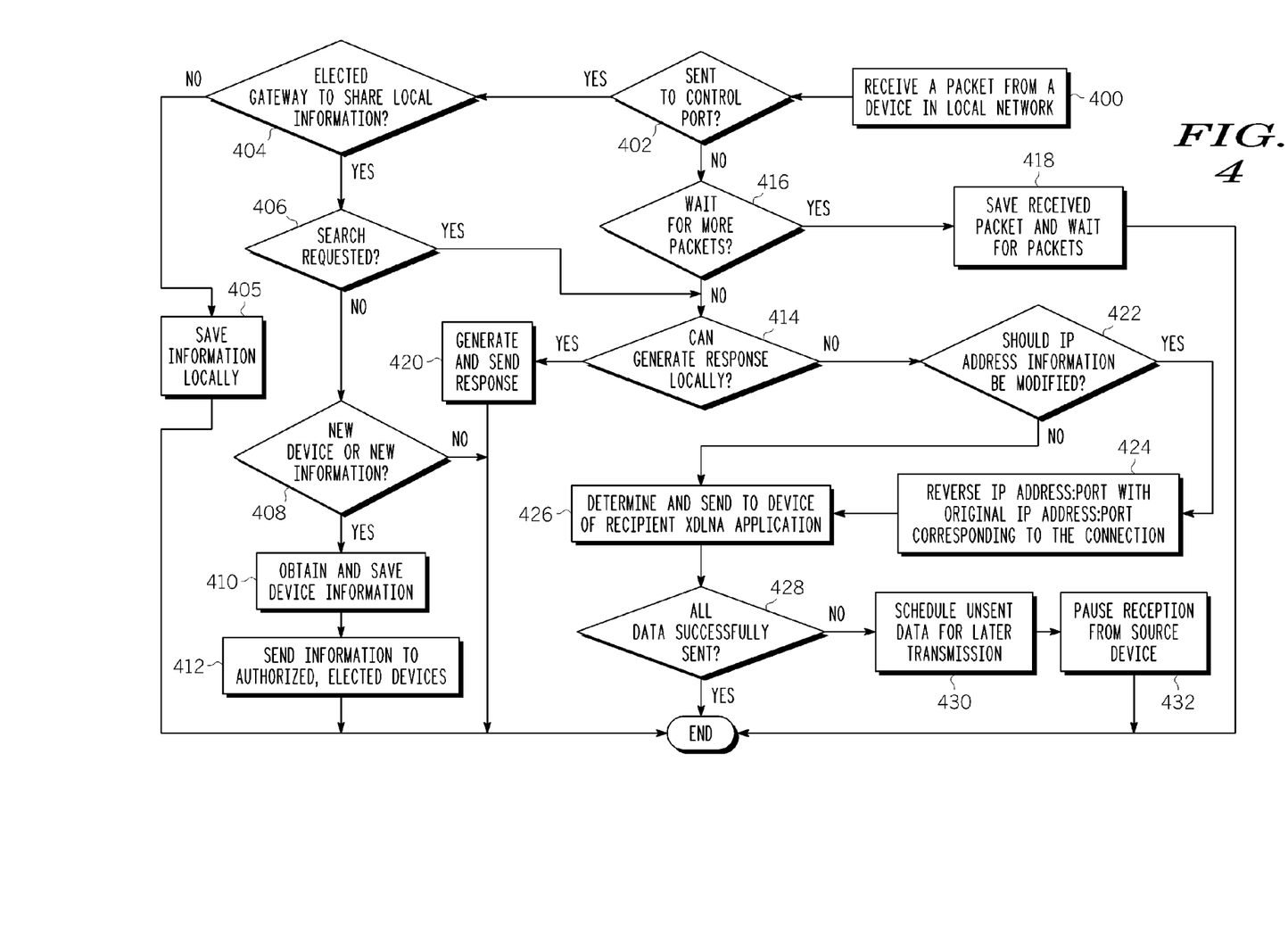
FIG. 4 is a block diagram of a method for sharing multimedia content in a peer-to-peer network arrangement including a first local or private network and a second network, showing the xDLNA application upon receiving packets in its local network.

Now referring to FIG. 4, shown are the steps in an xDLNA application upon receiving a packet while in its local network. On receiving a packet in its local network (step 400), if the packet was destined to a standard control port (step 402), such as an SSDP port, the xDLNA application determines whether the xDLNA application is a gateway into the local network for the xDLNA application's group (step 404). If the xDLNA application is the only xDLNA application corresponding to a group in a subnet, the xDLNA application is the gateway for that group in that local network. If there is more than one xDLNA application for a group in a given local area network, at least one of the xDLNA applications is elected as the gateway that shares information about local devices with remote group members and enables remote members to communicate with the local devices (step 405).

In one embodiment, xDLNA applications in a given subnet discover each other via local multicast, and elect one device to act as the gateway based on device capability (e.g., processing power and bandwidth). Only the elected device shares information about devices in the local subnet with other devices. Other devices only monitor the availability of the elected device and take over if the elected device becomes unavailable. In other embodiments, when there are multiple xDLNA applications in a given local network, the xDLNA applications can share the load by acting as the gateway for subsets of group members or by acting as the gateway for a subset of local devices. The xDLNA application can be configured to enforce the policies that specify the remote devices and groups that have access to devices in its local subnet or domain. The xDLNA application also can be configured to send information about local UPnP devices and services only to select groups or selected devices. For example, if an xDLNA application is part of a home group and a friends group, a user can configure certain UPnP devices and services to be shared only with home group. An elected gateway device determines if the advertisement is a search message or an informational message (step 406). For an informational message, such as a NOTIFY message about a new device (e.g., a new UUID field in the message) or new information (e.g., state information, new IP address, port values) (step 408), the xDLNA application will save the information locally (step 410). The xDLNA application also may obtain additional other information, such as device description information, as described hereinabove, and save the information locally. The information about local devices will also be shared with selected remote gateway devices in its groups. As described hereinabove, the saved information about local devices also will be transmitted to new xDLNA applications that join the group (step 412).

If the packet is a search request, or the packet is not sent to the control port, but instead to another port, then the xDLNA application determines if it needs to generate a response (step 414). For a search request, such as an M-SEARCH message, the local elected xDLNA application will respond with information about remote devices. To prevent redundant advertisements, an elected device will not respond with information about a remote device if it has seen an advertisement from another member corresponding to that remote device. Since a packet may be larger than Maximum Transmission Unit (MTU), a single message may be received as multiple packets. In such case, the xDLNA application may determine that the xDLNA application has to wait for more data (step 416), e.g., by checking content length, and wait to receive the entire message (step 418). The xDLNA application then assembles the packets to create the message, and then replaces the IP address value. The xDLNA application then determines if xDLNA application has sufficient information to generate a response message locally. If so, the xDLNA application sends the response message (step 420). For example, a response to an M-SEARCH request or a request for a description file may be generated locally. If some remote files are cached locally, the request for such files may also be served locally. Otherwise, the xDLNA application determines if information in the request message, such as the IP address:port in the packet, needs to be modified (step 422). In one instance, this determination is made by searching for the IP:port value in the received packet. For instance, in the example shown in FIG. 3, when the xDLNA application in Device 1 receives a message from DMR/CP, the Device 1 xDLNA application checks if there is an ip1:port1 value in the received packet and, if so, the xDLNA application reverses the address in the message (step 424) to ip2:port2, which represents the original value.

Once the message to be sent to the remote device is obtained, the xDLNA application determines the recipient device and sends the message to the xDLNA application in the recipient device (step 426). For example, in FIG. 3, when the xDLNA application in Device 1 receives the GET message, the Device 1 xDLNA application maps the connection from where the packet was received (e.g., socket descriptor CID1) to the destination device (in this case, Device 2) and send the message to the xDLNA application in Device 1.

In the embodiment shown in FIG. 3, Device 1 uses the overlay middleware. If the data is not fully sent (step 428), the reason may be because of a temporary disconnection or congestion in the link between the xDLNA application in Device 1 and the xDLNA application in Device 2. In that case, the xDLNA application schedules the packet for later transmission (step 430). For example, a SELECT SYSTEM call can be used to determine when more data can be sent. The xDLNA application also stops receiving data from the source that is feeding data into this congested link. In the example shown in FIG. 3, the xDLNA application in Device 1 will pause reception from DMS/CP (step 432). In one embodiment, this is done by not reading more data from CID1. If an xDLNA application in a remote network changes an IP address or becomes unavailable, then the overlay middleware will handle the process of finding the new IP address of the remote peer, or find a new xDLNA application that can act as a gateway in the remote network. In one embodiment, the new IP address can be determined using a message or a new connection request from the remote peer. The message then will be transmitted to the remote xDLNA application via the new connection. Since the connection of the local UPnP device is with its local xDLNA application, such changes in addresses are hidden from the UPnP device.

Figure 5:
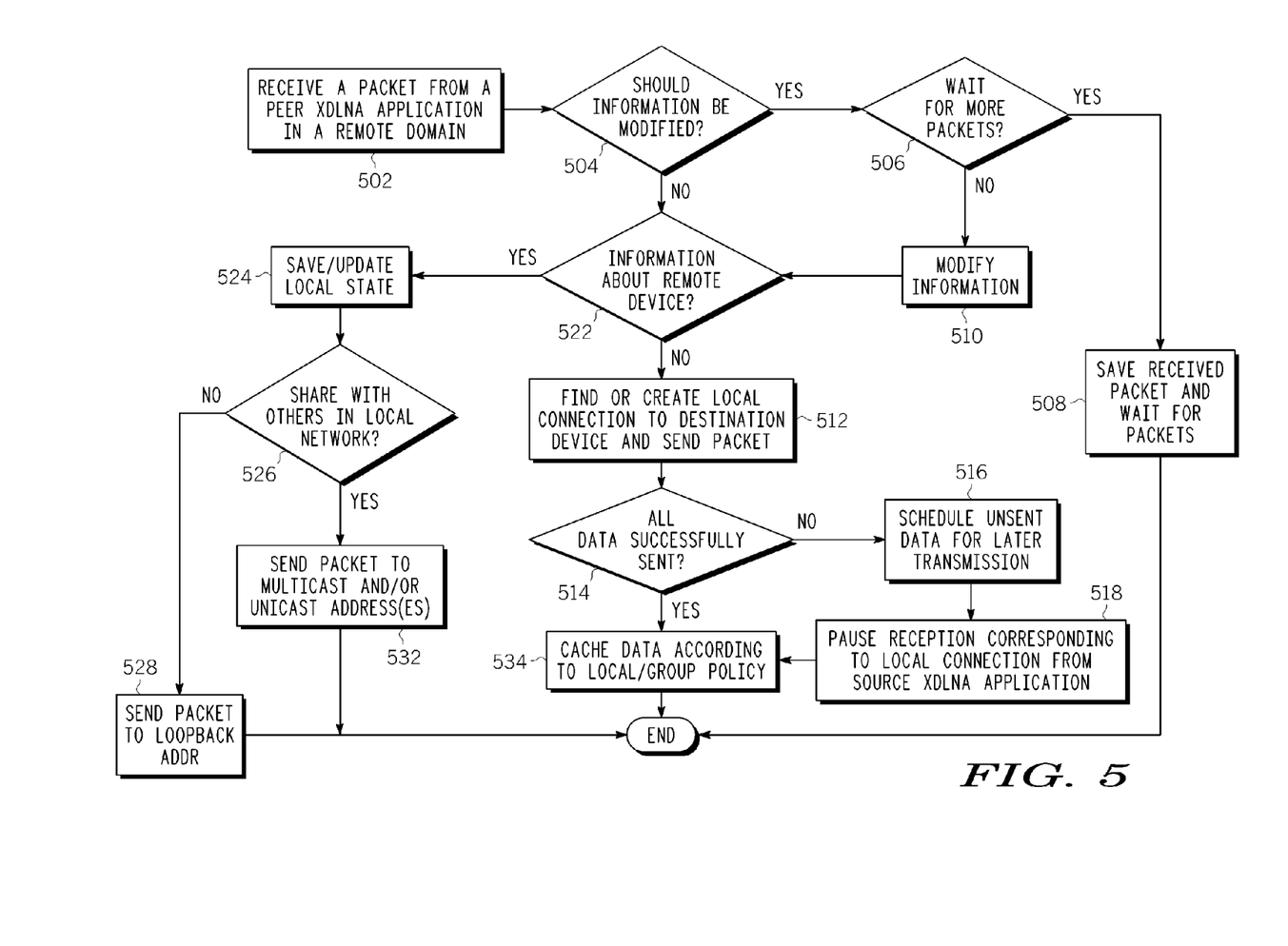
FIG. 5 is a block diagram of a method for sharing multimedia content in a peer-to-peer network arrangement including a first local or private network and a second network, showing the xDLNA application upon receiving packets from a peer xDLNA application in a remote network.

Referring now to FIG. 5, shown are the steps in the xDLNA application upon receiving a packet from a peer xDLNA application in a remote network (step 502). For example, such messages may be received when an xDLNA application joins a group, when new devices are discovered in remote networks by other xDLNA application, or when there is an exchange of data between UPnP or DLNA applications in the local domain and the remote domain. The xDLNA application first determines if the information in the receive message needs to be modified (step 504). For example, the name of the device (e.g., UUID) may be modified based on local configuration and state. For example, if the same UUID is received from devices in two different networks, that information may be modified. The xDLNA application also determines if the IP address in the received packet should be modified. This is determined based on the type of packet header and the content type. The xDLNA application intelligently scans for IP addresses only in selected messages that carry Content-Type: text/xml, e.g., messages that start with HTTP, POST, SUBSCRIBE, or NOTIFY. For messages that carry media, the xDLNA application looks at the header and then forwards the packet. Therefore, the processing overhead of scanning for addresses and modifying them is required only for a small subset of messages.

As a message can be split across multiple packets, using the content length to determine the total size of message, the xDLNA application waits for the entire message to arrive (steps 506, 508). Then, the xDLNA application checks for IP address markers, such as "Location:" and "http://", and replaces the remote IP address:port that follows them (step 510). If the address being replaced already has been seen from the source device, then the same mapping is used. However, if IP:port from the device is new, then a new (unused) port is located in the device and a TCP listener is created. When data is sent over the connection to a device in the local subnet (step 512), if all the data is not fully transmitted (step 514), then the xDLNA application schedules the unsent part of the message for later transmission (step 516), and pauses reception from the source (step 518).

The received message may be an informational message about remote devices, or the received message may be data packets, e.g., corresponding to a media stream (step 522). For informational packets, the xDLNA application may choose to store the information locally (step 524) so that the xDLNA application can generate the periodic advertisement messages or responses to request messages. such as M-SEARCH messages. Also, the local state may be updated to reflect changes in the remote network (step 524). For example, if the informational message indicates that a device in the remote network has left the network, the local state corresponding to that device may be updated or removed. For informational messages, the xDLNA application may generate a local advertisement to inform UPnP applications in the local domain or network (step 526). Such advertisements about remote devices may be sent to a loopback address (step 528), selected unicast addresses or a SSDP multicast address (step 532). In the case with the loopback address, only the local host will be able to see remote UPnP devices. For example, this occurs when a device that has the xDLNA application does not want the other devices in its current network to get information about remote UPnP/DLNA devices in its group. However, in cases where advertisements about remote devices are sent to a SSDP multicast address, the entire local subnet will be able to see the remote device. The xDLNA application also can be configured to share local devices with remote group members, but NOT expose remote devices to other devices in the local subnet. For example, a mobile device in a public hotspot may send information about a local printer to its group members, but may not broadcast information about DLNA devices in its remote group to other devices sharing the hotspot.

For example, referring again to FIG. 3, when the control point (CP) in Device 1 subscribes to events from the DMS, the control point sends a message similar to the following to IP1:port1, which corresponds to Device 1:

SUBSCRIBE/ContentDirectory_event HTTP1.1
TIMEOUT: Second-600
HOST: ip1:port1
CALLBACK: <http://ip1:port3/b00418da-1dd1-11b2-8f89-4a1225ddf79a/urn:upnporg:
serviceId:ContentDirectory>
NT: upnp:event
Content-Length: 0

In this case, the xDLNA application in Device 1 will receive this message and reverse the HOST: field in the message and replace ip1:port1 with ip2:port2. Note that in previous discussions herein, the xDLNA application in Device 1 modified ip2:port2 with ip1:port1. Such process is being reversed by the xDLNA application in Device 1, thus making its changes transparent to remote devices. The xDLNA application will map the connection in which the message is received to Device 2 and transmit the message to the xDLNA application in Device 2. On the other end, the xDLNA application in Device 2 will receive this message, and check for the presence of any remote address. In this case, the xDLNA application in Device 2 modifies the IP address and port that follows the marker http://in the CALLBACK: field from ip1:port3 to ip2:port4, and forwards this message using the corresponding connection to the DMR. If ip1:port3 is being used from Device 1 for the first time, then the xDLNA application in Device 2 also creates a new TCP listener socket connection and creates the necessary state to map connections to this socket to Device 1.

While in the above example addresses are modified only in the headers, in some cases, addresses are modified in the content that is carried inside the header. In the example message, HTTP/1.1 200 OK
CONNECTION: Keep-Alive
CONTENT-LENGTH: 14087
CONTENT-TYPE: text/xml; charset="utf-8"
DATE: Thu, 01 Jan. 1970 00:01:38 GMT
EXT:
SERVER: Linux/2.4.20_mvlcee31 . . .
<?xml version="1.0" encoding="utf-8" ?>
<s:Envelope . . .
</s:Envelope>

IP addresses may be present within the "<s:Envelope". These messages also can be received as multiple TCP segments. To change addresses, the xDLNA application checks the Content-length and Content-type fields. If the content type is text, then the xDLNA application first receives the entire payload (based on the size indicated in the Content-Length field), performs the address translation and updates the content-length field to reflect the new content length. If the content is not text, then the xDLNA application does not have to scan the packet for IP addresses and can simply forward the packet. The xDLNA application also can store all or part of such packet information (e.g., file/folder lists and copies of media files) locally, based on configured policy (step 534), so that the xDLNA application can rapidly respond to later requests for the same data. Thus, the presence of an xDLNA application and overlay middleware is completely transparent to the DMS, the DMR and the control point. Accordingly, the DMS, the DMR and the control point all will operate as if they are in the same subnet and are directly connected to each other.

In the presence of an NAT firewall, the methods and systems in the embodiment described hereinabove rely on the overlay middleware to handle issues related to establishing a communication path between peer devices and enabling the xDLNA applications to communicate. The xDLNA applications simply handle re-mapping the NAT-ed address in message exchanges between non-local DLNA devices to a local address that is routable from all local members of a domain. One advantage of this approach is that it can accommodate cases with multiple NAT-ed domains in a group. Depending on the type of NAT firewall, the overlay middleware can handle NAT-traversal using a variety of schemes without requiring any modifications in the xDLNA application.

Security issues related to group formation are handled by the overlay middleware. Different groups may have different schemes for securing group membership. One implementation relies on simple password-based security. When a new node contacts a super peer to obtain information about other group members, the new node and the super peer mutually authenticate each other using the group's password. Similarly, the HELLO and BYE message exchange also carries authentication codes for mutual authentication.

The methods, systems and devices described hereinabove enable network devices, including mobile communication devices, to use (or re-use) their UPnP/DLNA applications for directly sharing multimedia content between each other over wide-area networks. The overlay middleware described hereinabove enables UPnP peers to find each other across networks. The xDLNA application provides optimization to conserve device bandwidth and battery, while retaining all existing UPnP features. The method uses only generic network functions, and service-specific state and protocol awareness is limited to devices in the group. Such approaches enable relatively rapid proliferation of new services, as these new services can be easily deployed with enhancements only in the devices that need those services.

The methods shown in FIGS. 4 and 5 may be implemented in a general, multi-purpose or single purpose processor. Such a processor will execute instructions, either at the assembly, compiled or machine-level, to perform that process. Those instructions can be written by one of ordinary skill in the art following the description of FIGS. 4 and 5 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the multimedia content sharing methods, devices and systems herein described without departing from the spirit and scope of the invention as defined by the appended claims and their full scope of equivalents.

The invention claimed is:

1. A method for sharing multimedia content between at least one communication device in a local network and at least one communication device in a non-local network, comprising the steps of:

receiving by a first communication device in the local network a first message including a first header and a first message payload, wherein the first message includes information corresponding to a non-local communication device in the non-local network, and wherein the first message payload includes a first IP address and port information that is private to the non-local network;

mapping by the first communication device the first IP address and port information from the first message to a second local IP address information and local port information;

sending by the first communication device a second message including a second header and a second message payload, wherein the second message is sent to at least one second communication device in the local network, and wherein the second message payload includes the second local IP address and port information in place of the first;

creating by the first communication device a TCP listener for the second IP address and port information to proxy for the non-local communication device in the local network;

receiving by the first communication device a third message including a third header and a third message payload, wherein the third message is sent to the second IP address and the port from the at least one second communication device in the local network, wherein the third message includes, in the third message payload, the second IP address and port information;

mapping by the first communication device the second IP address information and port information in the third message payload of the third message to corresponding non-local IP address information and non-local port information;

repeatedly sending by the first communication device advertisement messages to devices in the local network on behalf of the non-local communication device while the non-local communication is idle and until a message is received from the non-local communication device by the first communication device indicating that non-local communication device is shutting down; and stopping sending by the first communication device advertisement messages to devices in the local network on behalf of the non-local communication device in response to the message being received from the non-local communication device by the first communication device indicating that non-local communication device is shutting down.

2. The method as recited in claim 1, wherein the step of the first communication device sending the second message includes sending the second message to at least one of a loopback address, a multicast address, and a unicast address.

3. The method as recited in claim 1, wherein the step of the first communication device sending the second message includes periodically retransmitting the second message and stopping the periodic retransmission in response to a determination by the first communication device that the non-local communication device is not reachable by the first communication device.

4. The method as recited in claim 1, wherein the step of the first communication device receiving the third message includes determining that only a first portion of the third message was received, and waiting for at least one second portion of the third message to be received before performing the mapping step and the fourth message sending step.

5. The method as recited in claim 1, wherein the information corresponding to the non-local communication device includes at least one of the contents of a NOTIFY message corresponding to the non-local communication device and the contents of a response to an M-SEARCH message.

6. The method as recited in claim 1, wherein the message information includes a content-length field, and wherein at least one of the mapping steps includes updating the content-length field based on a change in the number of bytes that results from mapping the IP address information and the port information.

7. The method as recited in claim 1, wherein the step of the first communication device sending the second message includes determining if portions of the second message being sent is not fully transmitted and stopping the reception of packets from the non-local communication device.

8. The method as recited in claim 1, further comprising:
receiving by the first communication device in the local network a fourth message including a fourth header and a fourth message payload;
analyzing information in the fourth header to determine a type of content being carried in the fourth message payload;
when the type of content is a first type, scanning the fourth message payload for IP address information to modify; and
when the type of content is a second type, forwarding the fourth message without scanning the fourth message payload to modify any IP addresses in the fourth message payload.

9. The method as recited in claim 1, further comprising:
analyzing information in the first header, the second header, or the third header to determine a type of content being carried in the first message payload, the second message payload, or the third message payload, respectively; and
when the type of content is a first type, scanning the first message payload, the second message payload, or the third message payload for IP address information to perform the mapping.

10. The method as recited in claim 1, further comprising the step of:
sending by the first communication device a fourth message to the non-local communication device in the non-local network, wherein the fourth message includes non-local IP address information and non-local port information that corresponds to the non-local communication device.

11. The method as recited in claim 10, wherein the step of sending the fourth message includes determining that the fourth message is not fully transmitted and stopping the reception of packets corresponding to the local IP address and the local port of the corresponding to non-local communication device.

12. The method as recited in claim 1, further comprising the step of the first communication device locating at least one peer device in the non-local network and establishing a communication session between the first communication device and the peer device in the non-local network.

13. The method of claim 12, further comprising the step of determining information corresponding to a local communication device and sending the information to the peer-device in the non-local network

\* \* \* \* \*